H. T. TILLOTSON.
VEHICLE SPRING STRUCTURE AND FRAME.
APPLICATION FILED DEC. 21, 1906.
900,234.
Patented Oct. 6, 1908.
3 SHEETS—SHEET 2.
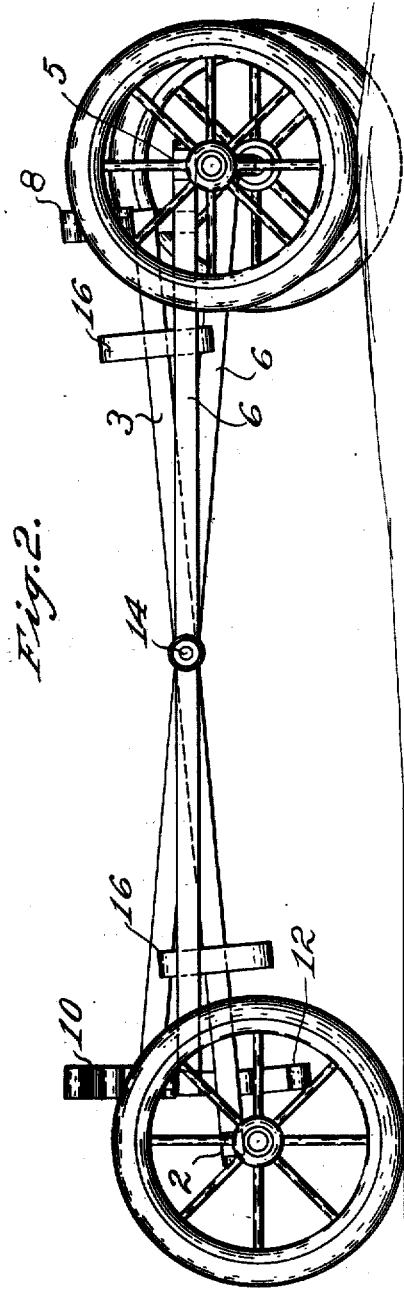
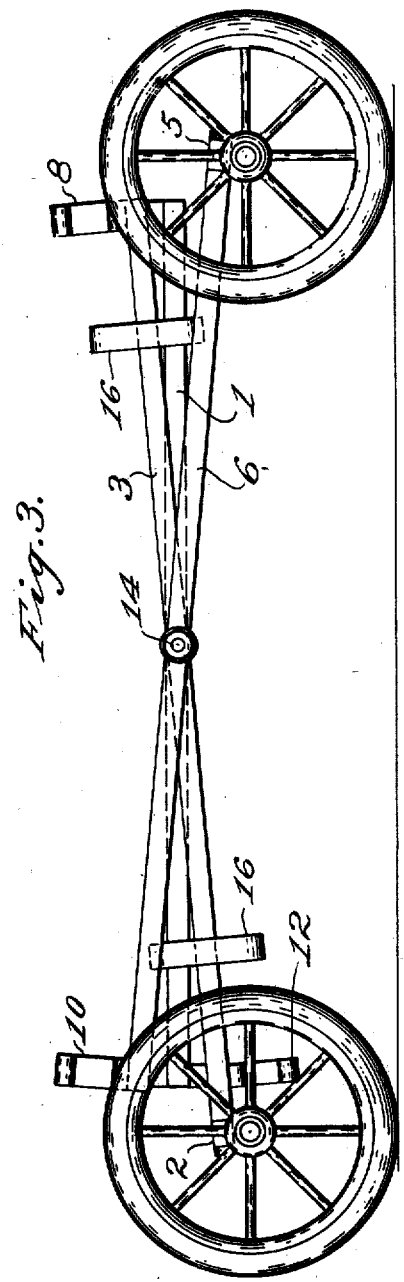
Witnesses:
Inventor,
H. T. Tillotson,
by Rummler & Rummler
Attorneys.

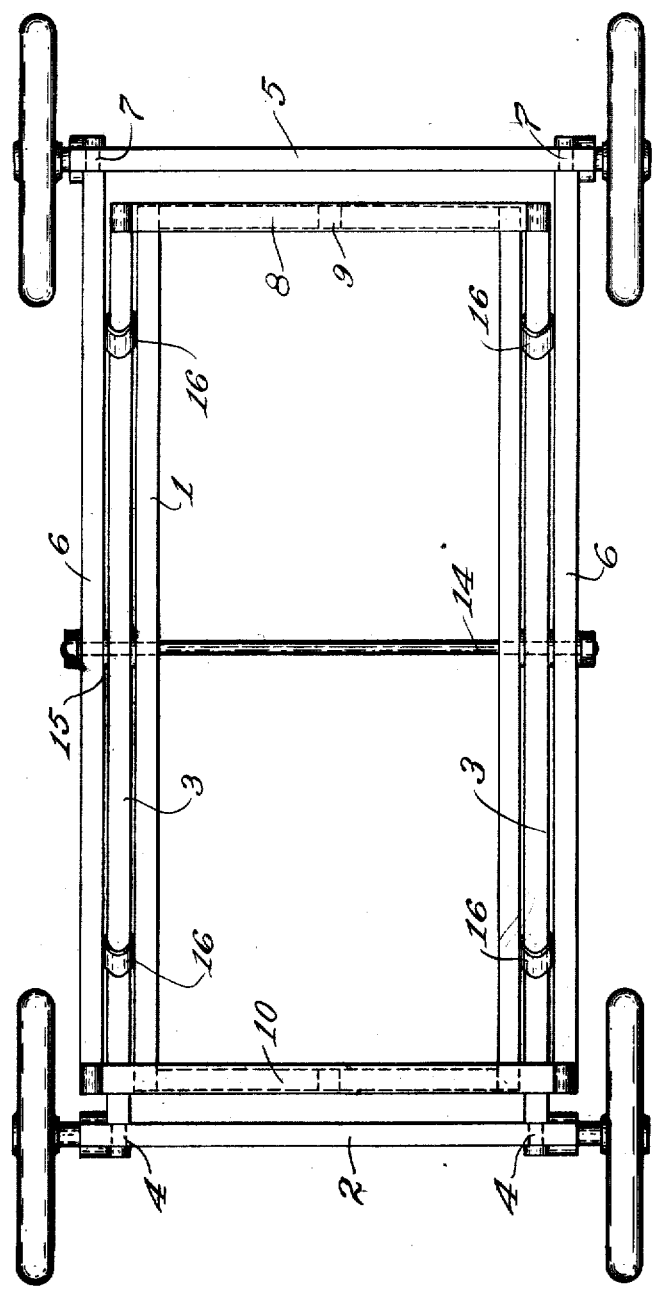

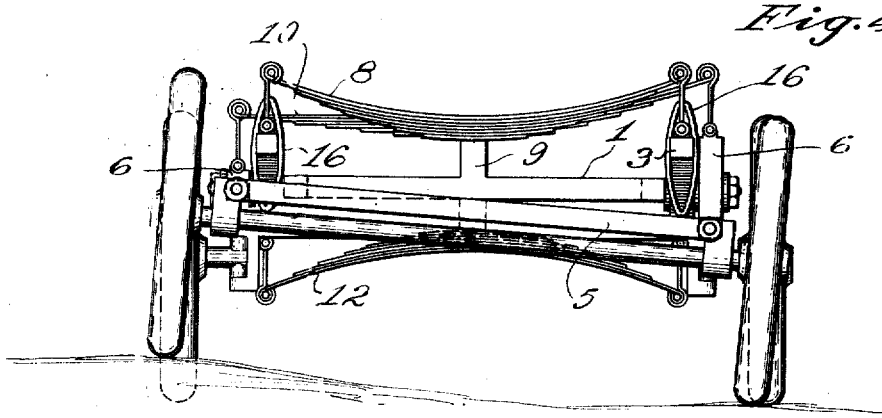
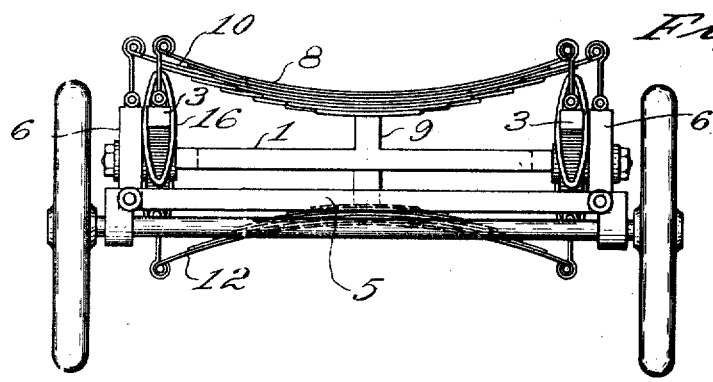
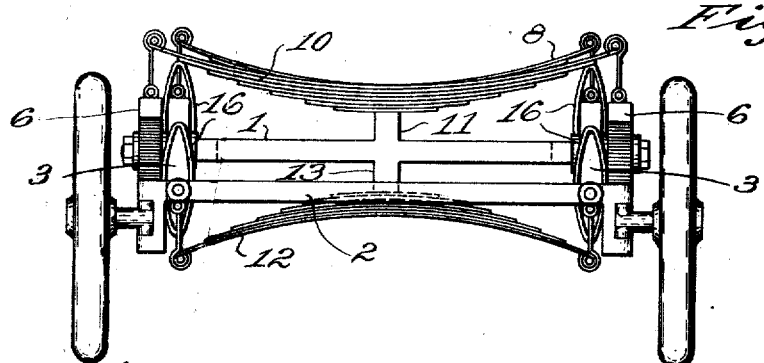

UNITED STATES PATENT OFFICE.

HARRY T. TILLOTSON, OF CHICAGO, ILLINOIS.

VEHICLE SPRING STRUCTURE AND FRAME.

No. 900,234.

Specification of Letters Patent.

Patented Oct. 6, 1908.

Application filed December 21, 1906. Serial No. 348,922.

*To all whom it may concern:*

Be it known that I, HARRY T. TILLOTSON, a citizen of the United States of America, and a resident of Chicago, in the county of Cook and State of Illinois, have invented certain new and useful Improvements in Vehicle Spring Structures and Frames, of which the following is a specification.

The main objects of this invention are to provide an improved structure for vehicle frames whereby each wheel may have a large range of vertical movement independently of the others, so as to permit the vehicle to pass easily over rough and irregular roads; and to provide a spring structure which, while yieldingly resisting the rising or descending of the wheels with respect to the body frame, will permit of a maximum movement of the wheels with a minimum tilting of the body frame. These objects are accomplished by the device shown in the accompanying drawings, in which:

Figure 1 is a top plan of a vehicle frame constructed according to this invention, the vehicle body and superstructure being omitted. Fig. 2 is a side elevation of the same showing the relative positions of the parts when one of the wheels is elevated as in passing over an irregularity in the roadbed. Fig. 3 is a similar elevation showing the vehicle resting upon a level roadbed. Fig. 4 is a rear view of the same showing the parts in relative positions corresponding to Fig. 2. Fig. 5 is a rear view of the same with the parts in their normal disposition as in Fig. 3. Fig. 6 is a front view showing the parts in their normal relation.

In the drawings, the supporting structure is shown with the load removed and the vertical angles between the parts which extend longitudinally of the frame are somewhat exaggerated for the sake of clearness of the illustration. When under normal load, with the vehicle body and its contents in position on the frame 1, the side bars will all lie substantially parallel with each other.

In the construction shown, the body of the vehicle, is carried by a rectangular body frame or member 1, which is substantially horizontal. Each pair of wheels is carried by a separate axle frame. The front axle frame consists of a transverse member 2 having a rearwardly extending part 3 at each side of the body member 1. The parts 3 preferably have swiveled or other yielding connection at 4 with the transverse member 2.

The rear or driving axle is journaled in a transverse member 5 which has forwardly extending parts 6 lying adjacent to the respective rearwardly extending parts of the front axle frame. The parts 6 are swiveled or otherwise yieldingly connected at 7 to the member 5. The rearward ends of the parts 3 of the front axle frame are connected to the rear end of the body member by means of a transversely disposed laminated leaf spring 8. This spring is preferably mounted on a short block or post 9 in the middle of the rear bar of the frame 1 and is concave upward. This allows the spring 8 to bend beyond a straight position and thereby admits of a large range of relative movement between the parts to which said spring is attached.

The front ends of the parts 6 of the rear axle-frame are connected with the body member 1 by a spring 10 mounted on a block 11 similar to that which carries the spring 8. An additional spring 12 secured to a block 13 below the member 1 connects said member with the parts 3 of the front axle-frame. This allows of greater spring strength at the front end of the machine where the weight of the driving motor is usually concentrated. The rearward end of the body member may be supported in a similar manner if desired.

Longitudinal shifting of the axle frames with respect to each other and with respect to the body member is prevented by pivoting or otherwise securing the adjacent longitudinal parts of said frames together preferably at a point about midway between the ends of the body member. In the form shown, this connection consists of a rod 14 which extends across the entire frame. The parts 3 and 6 and the longitudinal bars of the member 1 are spaced apart to avoid friction between them by means of washers 15 on the rod 14.

The guide shoes 16, mounted on the bars 3 near the ends of the body member, prevent the possibility of rubbing between said longitudinal bars when the frame is distorted in passing over an uneven road.

When one pair of the wheels is displaced from its normal position in passing over an irregularity in the roadbed, the corresponding axle frame rocks on its pivotal connection with the body member and the spring at the opposite end of the body frame yields to permit of such movement. If only one wheel rises, the corresponding axle may be tipped in its own vertical plane on account of its yielding connection with the longitudinal parts.

When one of the wheels is lifted out of its normal position with respect to the others, as in passing over an obstruction as illustrated in Figs. 2 and 4, the shock and tilting effects are distributed throughout the entire spring structure and are dissipated in the following manner:

Assume, for example, that only one wheel is in contact with the obstacle, this being one of the rear wheels, as illustrated in Figs. 2 and 4. This causes the rear axle to tilt the yielding connections between the bars 6 and the rear axle, permitting the distortion of the rear axle-frame which is thus caused. The adjacent bar 6 swings on the shaft 14, exerting an upward pressure at its pivotal connection with the body and exerting a downward pressure upon the front end of the body member through the springs 10 and 12. The downward pressure on the front end of the body member 1 tends to tilt the body on the shaft 14, but is resisted by the spring 8 which exerts an upward pull on the rear ends of the bars 3 and through said bars transmits the load to the front axle. Any deflection, therefore, of either of the springs is transmitted through the arrangement of levers to all of the other springs. The effect is that moderate shocks are dissipated in the supporting structure with little or no jar to the vehicle body, and severe shocks upon the wheels cause only a gentle swaying of the body. This results in an extremely easy and comfortable movement of the vehicle body, regardless of sudden and violent movements of the wheels in passing swiftly over a rough road.

What I claim as my invention and desire to secure by Letters Patent is:

1. A supporting structure, a member fulcrumed intermediate of its ends on said structure, and springs mounted on said structure at each end of said member and normally urging both ends thereof downward to maintain said member in equilibrium.

2. A vehicle frame, comprising a body member, a front axle-frame having a rearwardly extending part, a spring connection between said body member and the rearward end of said rearwardly extending part, a rear axle-frame having a forwardly extending part, a spring connection between said body member and the front end of said forwardly extending part, said rearwardly and forwardly extending parts of said axle-frames being hinged to each other between said spring connections.

3. A vehicle frame, comprising a body member, a front axle, a rearwardly extending part connected with said front axle, a spring connection between said body member and the rearward end of said rearwardly extending part, a rear axle, a forwardly extending part connected with said rear axle, a spring connection between said body member and the forward end of said forwardly extending part, said body member and said rearwardly and forwardly extending parts being pivotally connected together on a transverse axis between said spring connections.

4. A vehicle frame comprising a body frame, a front axle frame having a rearwardly extending part, a rear axle frame having a forwardly extending part, said rearwardly and forwardly extending parts of the axle frames being hinged to each other, and springs bearing between said body frame and each of said axle frames at the same side of the hinged connection between said axle frames for yieldingly resisting the movement of said axle frames with respect to the body frame.

5. A vehicle frame, comprising a supporting structure, a member yieldingly supported thereon, the supports for said member being all in substantial alinement and located intermediate of the ends of said member, to permit said member to oscillate on said supports, and springs mounted on said structure at each end of said member and normally urging both ends thereof downward to maintain said member in equilibrium.

6. A vehicle frame, comprising a body member, a front axle-frame having rearwardly extending bars disposed along said body member, a rear axle-fame having forwardly extending bars disposed along said body member, said forwardly and rearwardly extending bars being pivoted together on a transverse axis intermediate of their ends, spring connection between said body member and said rearwardly extending bars at a position rearward of said pivotal axis, spring connection between said body member and said forwardly extending bars at a position forward of said pivotal axis, and a yielding connection between said body member and said bars at a position intermediate between said spring connections.

7. A vehicle frame, comprising a body member, a front axle, a pair of bars connected to said front axle and extending rearwardly along said body member, a rear axle, a pair of bars connected to said rear axle and extending forwardly along said body member, said body member and said bars being pivotally connected together on a common transverse axis intermediate of their ends, spring connection between said body member and said rearwardly extending bars at a position rearward of said pivotal axis, and spring connection between said body member and said forwardly extending bar sat a position forward of said pivotal axis.

8. A vehicle frame, comprising a body member, a front axle, a pair of bars yieldingly connected to said front axle and extending rearwardly along said body member, a rear axle, a pair of bars yieldingly connected to the rear axle and extending forwardly along said body member, said body member and said bars being pivotally connected together on a common transverse axis intermediate of their ends, spring connection between said body member and said rearwardly extending bars at a position rearward of said pivotal axis, and spring connection between said body member and said forwardly extending bars at a position forward of said pivotal axis.

9. A vehicle frame, comprising a body member, a front axle, a rear axle, a pair of bars extending along respectively opposite sides of said body member and having spring connection with said body member at their rear ends and having yielding connection with said front axle at their front ends, a second pair of bars extending along respectively opposite sides of said body member, having spring connection with said body member at their front ends and having yielding connection with said rear axle at their rear ends, said body member and said bars being yieldingly connected together intermediate of their ends.

10. A vehicle frame, comprising a body member, a front axle, a pair of bars extending along opposite sides of said body member and yieldingly connected to said front axle, a second pair of bars extending along opposite sides of said body member and yieldingly connected with said rear axle, said body member and all of said bars being pivotally connected together intermediate of their ends, a carriage spring having its middle part connected to said body member near the rear end thereof and having its ends connected to said first pair of bars, and a second carriage spring having its middle part connected to said body member near the front end thereof and having its ends connected to said second pair of bars.

Signed at Chicago this 18th day of December 1906.

HARRY T. TILLOTSON.

Witnesses:
E. A. RUMMLER,
L. A. SMITH.